United States Patent
Khoo Meng Chuan et al.

(10) Patent No.: US 11,254,891 B2
(45) Date of Patent: Feb. 22, 2022

(54) MIXTURES OF TRIGLYCERIDES AND OF ALKYLESTERS FROM VEGETABLE OIL AND APPLICATIONS

(71) Applicants: BIOBOON LIMITED, Hong-Kong (CN); Laurent Richard Charles Dumortier, Penang (MY)

(72) Inventors: Jeffrey Khoo Meng Chuan, Pulau Penang (MY); Laurent Richard Charles Dumortier, Penang (MY)

(73) Assignee: BIOBOON LIMITED, Hong-Kong (CN)

( * ) Notice: Subject to any disclaimer, the term of this patent is extended or adjusted under 35 U.S.C. 154(b) by 0 days.

(21) Appl. No.: 16/966,994

(22) PCT Filed: Feb. 1, 2019

(86) PCT No.: PCT/IB2019/000153
§ 371 (c)(1),
(2) Date: Aug. 3, 2020

(87) PCT Pub. No.: WO2019/150202
PCT Pub. Date: Aug. 8, 2019

(65) Prior Publication Data
US 2021/0040410 A1    Feb. 11, 2021

(30) Foreign Application Priority Data
Feb. 1, 2018  (FR) ...................................... 18/50850

(51) Int. Cl.
*C10M 129/70* (2006.01)
*B09C 1/08* (2006.01)
(Continued)

(52) U.S. Cl.
CPC ............. *C10M 129/70* (2013.01); *B09C 1/08* (2013.01); *C10L 1/1802* (2013.01); *C10L 1/19* (2013.01);
(Continued)

(58) Field of Classification Search
CPC .............. C10M 129/70; C10M 169/04; C10M 2203/003; C10M 2207/281;
(Continued)

(56) References Cited

U.S. PATENT DOCUMENTS

2004/0231234 A1* 11/2004 May ...................... C10L 1/1802
  44/388
2006/0288637 A1* 12/2006 Choo ....................... C10L 1/026
  44/385

(Continued)

FOREIGN PATENT DOCUMENTS

CN    105670805 A    6/2016
WO    2008092207 A1   8/2008
(Continued)

OTHER PUBLICATIONS

Stepan Safety Data Sheet (Cited in US 20110275599) (Year: 2011).*
(Continued)

*Primary Examiner* — Pamela H Weiss
(74) *Attorney, Agent, or Firm* — Cantor Colburn LLP

(57) ABSTRACT

A mixture of alkylesters of fatty acids is provided, wherein the fatty acids have the following composition:
  at least 56% of saturated C12 chains,
  at least 23% of saturated C14 chains,
  at most 8% of saturated C16 chains,
  at most 5% of saturated C6-10 chains,
  at most 5% of monounsaturated C18 chains,
  at most 2% of saturated C18 chains,
  at most 0.8% of diunsaturated C18 chains,
(Continued)

and at most 0.2% of saturated C20 chains. The percentages are an average percentage expressed in number of moles per total number of moles of alkylesters, and the use of these mixtures is as a viscosity agent.

12 Claims, 1 Drawing Sheet

(51) Int. Cl.

| | |
|---|---|
| C10L 1/18 | (2006.01) |
| C10L 1/19 | (2006.01) |
| C10L 10/02 | (2006.01) |
| C10L 10/08 | (2006.01) |
| C10L 10/18 | (2006.01) |
| C10M 169/04 | (2006.01) |
| C10N 30/04 | (2006.01) |
| C10N 40/25 | (2006.01) |

(52) U.S. Cl.
CPC .............. *C10L 10/02* (2013.01); *C10L 10/08* (2013.01); *C10L 10/18* (2013.01); *C10M 169/04* (2013.01); *C10L 2200/0453* (2013.01); *C10L 2200/0484* (2013.01); *C10M 2203/003* (2013.01); *C10M 2207/281* (2013.01); *C10N 2030/04* (2013.01); *C10N 2040/25* (2013.01)

(58) Field of Classification Search
CPC ... C10M 2207/40; C10M 159/08; B09C 1/08; C10L 1/1802; C10L 1/19; C10L 10/02; C10L 10/08; C10L 10/18; C10L 2200/0453; C10L 2200/0484; C10L 2200/0407; C10N 2030/04; C10N 2040/25; C10N 2030/02; C10N 2030/06
See application file for complete search history.

(56) References Cited

U.S. PATENT DOCUMENTS

| | | | | |
|---|---|---|---|---|
| 2009/0199463 | A1* | 8/2009 | May | ........................ C10L 1/19 |
| | | | | 44/388 |
| 2010/0234625 | A1* | 9/2010 | Papadogianakis | ...... C11C 3/126 |
| | | | | 554/141 |
| 2011/0021396 | A1* | 1/2011 | Perry | ....................... C10L 1/14 |
| | | | | 508/463 |
| 2011/0023352 | A1* | 2/2011 | Knuth | ..................... C10L 1/026 |
| | | | | 44/385 |
| 2011/0030269 | A1 | 2/2011 | Chasan et al. | |
| 2011/0275599 | A1* | 11/2011 | Voglewede | ............ A01N 25/02 |
| | | | | 514/89 |
| 2012/0021366 | A1* | 1/2012 | Moller | ...................... C10L 1/02 |
| | | | | 431/320 |
| 2012/0042565 | A1 | 2/2012 | Theaker | |

FOREIGN PATENT DOCUMENTS

| | | | | |
|---|---|---|---|---|
| WO | WO-2010024659 | A1 * | 3/2010 | ............ C11B 3/005 |
| WO | 2014190436 | A1 | 12/2014 | |

OTHER PUBLICATIONS

"Binary mixtures of fatty acid methyl esters as phase change materials for low temperature applications" Applied Thermal Engineering by Lea Liston, Yaghoob Farnam, Matthew Krafcik, Jason Weiss, Kendra Erk and Bernard Tao. (Jun. 2016) 501-507 Available online Dec. 9, 2015. (Year: 2015).*
Stepan Steposol Product Bulletin (Year: 2015).*
Stepan Environmentally Friendly Agricultural Solvents Properties (Year: 2015).*
International Search Report dated Jul. 24, 2019 re: Application No. PCT/IB2019/000153, pp. 1-4, citing: CH 105 670 805 A, M. Rojas "Biodiesel Magazine . . . ", J. Musa "Evaluation of the Lubricating . . . ", WO 2014/190436 A1, WO 2008/092207 A1, US 2011/030269 A1, Pantzaris et al. "Properties and Utilization . . . ".
John J Musa, "Evaluation of the Lubricating Properties of Palm Kernel Oil", Leonardo Electronic Journal of Practices and Technologies, Jan.-Jun. 2009, p. 107-114.
Mauricio Rojas, "Assessing the Engine Performance of Palm Oil Biodiesel", Biodiesei Magazine—The Latest News and Data About Biodiesel Production, Aug. 3, 2007, pp. 1-3.
T P Pantzaris et al, "Properties and Utilization of Palm Kernel Oil", Malaysian Palm Oil Board (MPOB), 2001, pp. 11-23.
T. Venketa Subba Rao et al., "Performance Analysis of Vegetable Oil Blended with Diesel Additive", International Journal of Engineering Research and Applications (IJERA), Sep.-Oct. 2012, vol. 2, Issue 5, pp. 297-302.
Written Opinion dated Jul. 24, 2019 re: Application No. PCT/IB2019/000153, pp. 1-7, citing: CH 105 670 805 A, M. Rojas "Biodiesel Magazine . . . ", J. Musa "Evaluation of the Lubricating . . . ", WO 2014/190436 A1, WO 2008/092207 A1, US 2011/030269 A1, Pantzaris et al. "Properties and Utilization . . . ".

* cited by examiner

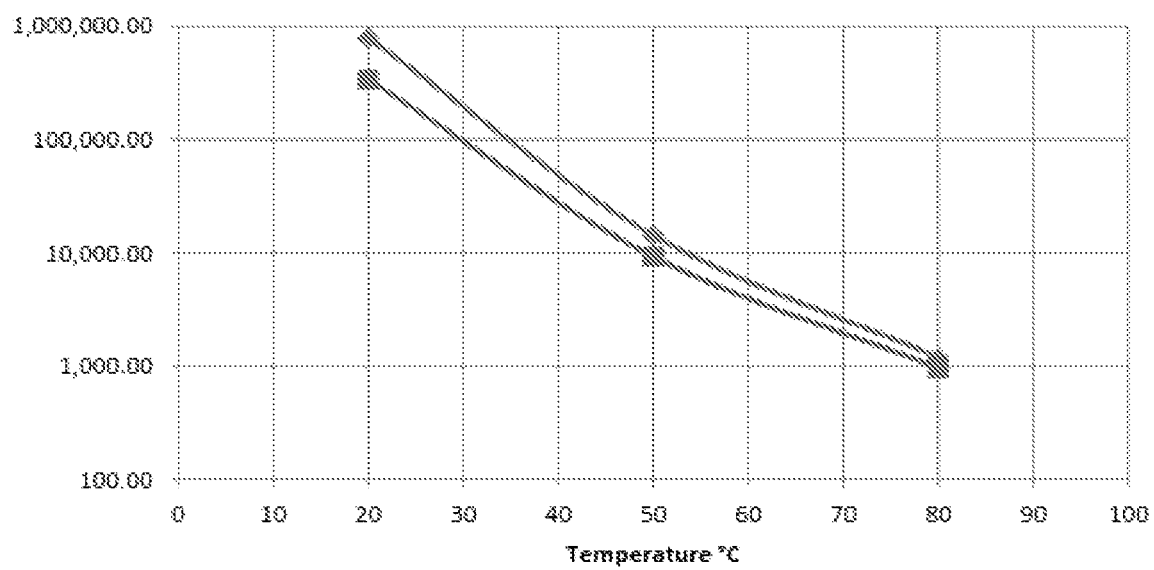

MIXTURES OF TRIGLYCERIDES AND OF ALKYLESTERS FROM VEGETABLE OIL AND APPLICATIONS

TECHNICAL FIELD

The disclosure concerns the use of a vegetable oil for preparing mixtures of fatty acid triglycerides and mixtures of fatty acid alkylesters, for use as an additive in petroleum products, as an agent for treating contaminated soils and a fuel additive for combustion engines to decrease pollutant emissions.

BACKGROUND

T. Venketa Subba Rao et al., International Journal of Engineering Research and Applications (2012) Vol. 2, Issue 5, pages 297-302 pertains to the influence of an additive of petroleum origin on the performances of a biodiesel obtained from kern palm oil and of mixtures of said biodiesel and diesel comprising 10-30% of biodiesel and 90-70% of diesel. This biodiesel consists of methyl esters resulting from transesterification of said kern palm oil and exhibits a higher viscosity and a lower calorific value than those of diesel and a similar density. A mixture of 25% of said biodiesel and 75% of diesel shows the best efficiency with a viscosity of 3.647 cSt, a calorific value of 41 337.5 KJ/kg and a density of 0.850 (Kg/mm$^3$). The authors observed that the brake thermal efficiency was increased with regards to a standard fuel diesel by 2.18 for a mixture 25% biodiesel-75% diesel, by 1.11% for a mixture of diesel and said additive and by 2.73% for a mixture 25% biodiesel-75% diesel and said additive.

US2012/0042565 discloses a fuel additive comprising a mixture of diesel fuel and a naturally occurring oil derived from animal or plants sources, and specifically a mixture of diesel fuel and olive oil, said additive providing improved combustion efficiency.

SUMMARY

In accordance with the disclosure, it is provided mixtures of selected fatty acid triglycerides and mixtures of selected fatty acid alkylesters which can be obtained from a vegetable oil, specifically from palm kernel oil, palm oil and candle nut oil. These mixtures have many applications as an additive where they can at least partially but preferably totally replace an additive of synthesis, the additive of the disclosure being efficient in very low amounts.

Some terms used in this text are defined below.

A vegetable oil means that an oil may be obtained, generally by extraction, from fruits, parts of fruits and/or seeds of a plant or a tree.

The expression alkyl refers to saturated, straight-chain or branched hydrocarbon groups having 1 to 12 carbon atoms, preferably 1 to 6 carbon atoms, for example methyl, ethyl, propyl, isopropyl, isobutyl, tert-butyl, n-hexyl. Advantageously, it is methyl or ethyl.

By a mixture or a combination of fatty acid triglycerides or of triglycerides, it is understood a mixture of triesters of fatty acids and glycerol combining glycerol and three fatty acid molecules, said molecules being identical or not. In the context of the disclosure, this mixture or this combination of triglycerides is defined on the basis of the fat aliphatic chain of the fatty acids, and precisely on the basis of the carbon-atom number and the unsaturation number of the fatty acid(s) present in the triglycerides.

By a mixture or a combination of fatty acid alkylesters or of alkylesters, it is understood a mixture of esters of fatty acids which can be derived by transesterification, preferably by saponification, of said fatty acids with an alcohol. Advantageously this alcohol is methanol or ethanol, and the fatty acid alkylester is a fatty acid methylester or a fatty acid ethylester, respectively. In the context of the disclosure, this mixture or this combination of fatty acid alkylesters is defined on the basis of the fat aliphatic chain of the fatty acid present in said fatty acid alkyester, and precisely on the basis of the carbon-atom number and the unsaturation number of the fatty acid.

Throughout the text, a mixture or a combination should be seen as comprising the listing ingredients or as consisting of the listing ingredients.

The present disclosure relates to a mixture of alkylesters of fatty acids, wherein the fatty acids have the following composition:
- at least 56% of saturated C12 chains,
- at least 23% of saturated C14 chains,
- at most 8% of saturated C16 chains,
- at most 5% of saturated C6-10 chains,
- at most 5% of monounsaturated C18 chains,
- at most 2% of saturated C18 chains,
- at most 0.8% of diunsaturated C18 chains,
- at most 0.2% of saturated C20 chains, the percentages being an average percentage expressed in number of moles per total number of moles of alkylesters.

The disclosure also relates to a mixture of alkylesters of fatty acids, said mixture comprising:
50-70 weight % of a mixture of alkylesters of fatty acids, wherein the fatty acids have the following composition:
- at least 56% of saturated C12 chains,
- at least 23% of saturated C14 chains,
- at most 8% of saturated C16 chains,
- at most 5% of saturated C6-10 chains,
- at most 5% of monounsaturated C18 chains,
- at most 2% of saturated C18 chains,
- at most 0.8% of diunsaturated C18 chains,
- at most 0.2% of saturated C20 chains, and 30-50 weight % of a mixture of alkylesters of fatty acids, wherein the fatty acids have the following composition:
- at least 74% of monounsaturated C18 chains,
- at most 13% of diunsaturated C18 chains,
- at most 13% of saturated C6-18 chains,
- at most 1% of saturated C20 chains, the percentages being an average percentage expressed in number of moles per total number of moles of alkylesters.

In an embodiment of the disclosure, most of or all the unsaturations of the mono- and diunsaturated chains are cis.

As mentioned above, the disclosure provides mixtures of selected fatty acid alkylesters and the mixtures below described are advantageous embodiments.

In accordance with an embodiment, a mixture of fatty acid alkylesters has the following composition:
- 35.60-42.15% of monounsaturated C18 chains,
- 27.60-31.40% of saturated C12 chains,
- 10.50-13.70% of saturated C14 chains,
- 5.80-7.30% of diunsaturated C18 chains,
- 3.50-5.15% of saturated C16 chains,
- 2.70-4.50% of saturated C6-C10 chains,
- 0.70-1.25% of saturated C18 chains, and
- 0.50-1.15% of saturated C20 chains, the percentages being an average percentage expressed in number of moles per total number of moles of alkylesters.

In accordance with another embodiment, a mixture of fatty acid alkylesters has the following composition:
  36.30-42.50% of saturated C12 chains,
  20.60-27.30% of monounsaturated C18 chains,
  14.60-17.30% of saturated C14 chains,
  5.30-6.40% of saturated C16 chains,
  3.80-4.75% of diunsaturated C18 chains,
  2.50-3.70% of saturated C6-C10 chains,
  1.05-1.80% of saturated C18 chains, and
  0.50-1.15% of saturated C20 chains,
the percentages being an average percentage expressed in number of moles per total number of moles of alkylesters.

The disclosure also relates to the applications of any mixture of the disclosure as defined above.

In accordance with the disclosure, there is provided a viscosity additive for petroleum products comprising a mixture of fatty acid alkylesters of the disclosure, said additive being effective in the absence of any other viscosity agent.

In another embodiment, it is provided a lubricating additive for petroleum products comprising a mixture of fatty acid alkylesters of the disclosure, said additive being effective in the absence of any other lubricating agent.

It has also been discovered that the mixtures of the disclosure may be used in the field of soil remediation, and specifically for treating contaminated soils.

Yet another application of mixtures of fatty acid alkylesters of the disclosure is their use in a fuel supplied to a combustion engine, for decreasing exhaust gas by said combustion engine.

The performances of a mixture of the disclosure are observed in low concentrations of said mixture. Thus, it may be used as a viscosity agent for petroleum products, as a detergent or as a lubricant, in a proportion ranging from 0.5-5 weight % relative to the treated mass. As an additive for use in a fuel supplied to a combustion engine, for decreasing exhaust gas by said combustion engine, a preferred ratio of said additive to said fuel is in the range of 1/800-1/1250.

The disclosure further concerns a synergistic combination of triglycerides whose hydrocarbon chains have the following composition a):
  at least 56% of saturated C12 chains,
  at least 23% of saturated C14 chains,
  at most 8% of saturated C16 chains,
  at most 5% of saturated C6-10 chains,
  at most 5% of monounsaturated C18 chains,
  at most 2% of saturated C18 chains,
  at most 0.8% of diunsaturated C18 chains,
  at most 0.2% of saturated C20 chains.

It also relates to a synergistic combination of:
  a) 50-70 weight % of a triglycerides fraction whose hydrocarbon chains have the following composition:
    at least 56% of saturated C12 chains,
    at least 23% of saturated C14 chains,
    at most 8% of saturated C16 chains,
    at most 5% of saturated C6-10 chains,
    at most 5% of monounsaturated C18 chains,
    at most 2% of saturated C18 chains,
    at most 0.8% of diunsaturated C18 chains,
    at most 0.2% of saturated C20 chains,
    and
  b) 30-50 weight % of a triglycerides fraction whose hydrocarbon chains have the following composition:
    at least 74% of monounsaturated C18 chains,
    at most 13% of diunsaturated C18 chains,
    at most 13% of saturated C6-18 chains,
    at most 1% of saturated C20 chains, the percentages of the hydrocarbon chains being an average percentage expressed in number of moles per total number of moles of triglycerides.

According to a preferred variant of these combinations, most of or all the unsaturations of the mono- and diunsaturated chains in fraction a) and/or fraction b) are cis.

The disclosure also concerns the use of any one of the aforementioned combinations, for preparing a viscosity agent for petroleum products, a detergent, a lubricant.

Advantageous combinations of the disclosure are presented below:
  A combination of triglycerides having the following composition:
    35.60-42.15% of monounsaturated C18 chains,
    27.60-31.40% of saturated C12 chains,
    10.50-13.70% of saturated C14 chains,
    5.80-7.30% of diunsaturated C18 chains,
    3.50-5.15% of saturated C16 chains,
    2.70-4.50% of saturated C6-C10 chains,
    0.70-1.25% of saturated C18 chains, and
    0.50-1.15% of saturated C20 chains.
  Another combination having the following composition:
    36.30-42.50% of saturated C12 chains,
    20.60-27.30% of monounsaturated C18 chains,
    14.60-17.30% of saturated C14 chains,
    5.30-6.40% of saturated C16 chains,
    3.80-4.75% of diunsaturated C18 chains,
    2.50-3.70% of saturated C6-C10 chains,
    1.05-1.80% of saturated C18 chains, and
    0.50-1.15% of saturated C20 chains.

In said combination, the percentages of the hydrocarbon chains being an average percentage expressed in number of moles per total number of moles of triglycerides.

As indicated above, the mixtures or combinations of the disclosure of fatty acid alkyesters or of fatty acid triglycerides, may be derived for renewable resources, in particular from trees or plants that can be specifically planted or cultivated and dedicated to this production. The resources of these mixtures are therefore inexhaustible and their manufacture is not polluting. Preferably, the mixtures of the disclosure may come from an oil selected from palm kernel oil, palm oil and candle nut oil. Thus the disclosure also relates to the use of one oil selected from palm kernel oil, palm oil and candlenut oil, for preparing any mixture of fatty acid alkylesters of the disclosure, or any additive of the disclosure. It yet pertains to the use of one of the above-mentioned oil to prepare mixtures or combinations of fatty acid triglycerides of the disclosure.

The mixtures of fatty acid alkyl esters preferably result from transesterification, in particular from saponification, of said oil, or from a mixture of fatty acid triglycerides of the disclosure. The saponification is carried out under typical conditions that are well-known from the skilled in the art. Any further step may be implemented to obtain a mixture of the disclosure, said step(s) being within the knowledge of the skilled in the art.

BRIEF DESCRIPTION OF THE DRAWING

The disclosure and its advantages are illustrated in the following examples in support of the FIGURE.

The FIGURE illustrates the decrease in viscosity (expressed in centiStokes) as a function of the temperature (expressed in ° C.) of a petroleum sample (petroleum from the Fort McMurray deposit in Canada) [♦] and a sample of the same petroleum containing an additive of the disclosure in a proportion of 2% (v/v) [■].

DETAILED DESCRIPTION OF THE DISCLOSURE

Example 1

Performances of an Additive of the Disclosure

An additive of the disclosure is prepared from palm kernel oil by saponification and comprises a mixture of fatty acid alkylesters having the following composition:

Saturated C6-C10 chains—5%

Saturated C12 chains—56%

Saturated C14 chains—23%

Saturated C16 chains—8%

Saturated C18 chains 0-2%

Monounsaturated C18 chains—5%

Diunsaturated C18 chains—0.8%

Saturated C20 chains—0.2% the percentages of the hydrocarbon chains being an average percentage expressed in number of moles per total number of moles of alkylester.

The performances of this additive are tested on petroleum from the Fort McMurray deposit in Canada, by comparison between a petroleum sample and a petroleum sample containing 2% (v/v) of said additive.

Density, API gravity and viscosity are determined for each sample. The lighter a petroleum is, the lower are its density and viscosity and the higher is its API gravity.

The density is measured on a glass pycnometer, at 25° C., it is expressed in kg/m$^3$.

The API gravity allows expressing the gravity of a crude petroleum from the gravity by the following formula:

$$API\ gravity\ \left(\text{expressed in degrees } API° = \frac{141.5}{(\text{gravity at } 60° \text{ F.})} - 131.5\right)$$

Viscosity is measured with a Brookfield HBDV-II+Pro apparatus and a Brookfield LVDV-III Ultra apparatus used according to the prescribed instructions for using these viscometers.

The table below presents the results of these measurements.

TABLE 1

| % additive | Density at 25° C. | API Gravity | Viscosity (cSt) | | |
|---|---|---|---|---|---|
| (v/v) | (Kg/m$^3$) | (° API) | at 20° C. | at 50° C. | at 80° C. |
| 0 | 1.0229 | 6.71 | 793 821.49 | 14 338.32 | 1 200.51 |
| 2 | 0.9970 | 10.43 | 341 023.07 | 9 294.55 | 966.90 |
| Viscosity reduction rate (%) | | | 57 | 35 | 19.5 |

It is observed that at a content as low as 2% (v/v), the additive of the disclosure allows increasing the API gravity by 4° AP and lowering the viscosity by up to 57% when it is measured at 20° C.; These results demonstrate the performances of an additive of the disclosure and pave the way for a promising future for it in particular in the petroleum industry.

Example 2

Viscosity and AIP Gravity Reduction of a Crude Oil and Crude Oil and Naptha Mixtures, Comprising an Additive of the Disclosure In this example, the additive of Example 1 is used in a petroleum product (PP) comprising a crude oil as a fuel and/or naptha as specified in Table 2 below. Naphta is generally used as a thinner to allow for crude oil to be moved through pipeline.

The viscosity and the API gravity are measured for each sample in conditions similar to those of the measurement in Example 1.

Table 2 below presents the results of these measurements.

TABLE 2

| | Constituents | | | API Gravity (°API) | | Viscosity |
|---|---|---|---|---|---|---|
| PP | Cude oil | Naphta | Additive | At 15.5° C. | At 26° C. | (en cP) |
| 1 | 1000 | 0 | 0 | 7.4 | 8.4 | 4702.3 |
| 2 | 95 | 4.5 | 0.5 | 14.3 | 15.3 | 1442.8 |
| 3 | 95 | 4.25 | 0.75 | 15.4 | 16.4 | 876.8 |
| 4 | 95 | 4 | 1 | 16.4 | 17.4 | 809.8 |
| 5 | 95 | 3.75 | 1.25 | 17.9 | 19 | 658.6 |
| 6 | 95 | 3.5 | 1.5 | 18.3 | 19.4 | 634.8 |
| 7 | 95 | 3.25 | 1.75 | 19.2 | 20.3 | 563.5 |
| 8 | 95 | 3 | 2 | 19.2 | 21.7 | 553.5 |

These results confirm the observations of Example 1 and evidence the capacity of an additive of the disclosure to increase he API gravity and decrease the viscosity of a petroleum product.

Example 3

Viscosity Reduction of Crude Oil by an Additive of the Disclosure

Crude oils were collected from three different wells in Ebok oilfield (Ebok-11, Ebok-14 and Ebok-44) which is located in an oil mining lease (OML 67), offshore Nigeria.

For each crude oils, 500 mL-samples were prepared, containing the crude oil only and increasing quantities of an additive of the disclosure, respectively, and their viscosity measured for two temperatures, 29° C. corresponding to room temperature and one between 34° C. and 48° C. corresponding to the flowline temperature (temperature at which the crude oils is carried in the pipes).

The additive of Example 1 is used.

A viscometer usually employed in crude oil technology is used. It was calibrated with a R4 spindle over temperature range of 20-25° C. and at viscosity value not exceeding 3,333 mPa.

The results are reported in table 3 below.

TABLE 3

| Crude oil | Crude oil (mL)/ Additive (mL) | % additive (v/v) | Viscosity (mpas) | |
|---|---|---|---|---|
| EBOK-11 | | | At 29° C. | At 48° C. |
| | 500/0 | 0 | 3333 | 990 |
| | 497.5/2.5 | 0.5 | 3333 | 905 |
| | 495/5 | 1 | 3333 | 710 |
| | 492.5/7.5 | 1.5 | 3045 | 610 |
| | 490/10 | 2 | 2950 | 555 |
| | 485/15 | 3 | 2240 | 450 |
| EBOK-14 | | | At 29° C. | At 44° C. |
| | 500/0 | 0 | 3333 | 520 |
| | 497.5/2.5 | 0.5 | 3250 | 480 |
| | 495/5 | 1 | 3090 | 380 |
| | 492.5/7.5 | 1.5 | 2890 | 340 |
| | 490/10 | 2 | 2640 | 310 |
| | 485/15 | 3 | 2210 | 270 |
| EBOK-44 | | | At 29° C. | At 34° C. |
| | 500/0 | 0 | 885 | 310 |
| | 497.5/2.5 | 0.5 | 790 | 300 |
| | 495/5 | 1 | 720 | 260 |
| | 492.5/7.5 | 1.5 | 705 | 240 |
| | 490/10 | 2 | 655 | 220 |
| | 485/15 | 3 | 550 | 200 |

EBOK-11:

Viscosity measurements at atmospheric temperature without the additive in the crude oil recorded very high value (+3,333 mPas) in excess of the maximum range the viscometer is calibrated to operate.

Usually outside the maximum range of value the viscometer will record no value. Similarly no value viscosity values were recorded for sample at 0.5% and 1% additive, respectively, suggesting also out of range.

However at 1.5%, the viscosity reduced to 3,045 mPas. At 2% and 3% additive, the crude oil viscosity further reduced to 2,950 mPas and 2,240 mPas, respectively. This suggests that viscosity of the crude oil was actually reduced by more than 33% recorded, if the initial actual viscosity value without additive were measured.

At flowing temperature, the crude oil viscosity was reduced by 55%.

In overall, the additive has demonstrated its capability to reduce EBOK-11 crude oil viscosity by more than 50% at application of 3% additive to the crude oil volume.

EBOK-14:

At atmospheric temperature, the viscosity of the crude oil (without additive) was higher than the range (3,333 mPas) that the viscometer in the field was calibrated to handle. However with introduction of 0.5% additive, the viscosity reduced to 3,250 mPas. Further reduction in viscosity was measured with addition of more volume of additive. At 3% BNO-1 addition for example, the crude oil viscosity reduced to 2,210 mPas. This indicates that EBOK-14 crude oil viscosity was actually reduced by more than 34% recorded if the initial viscosity value were recorded.

At flowing temperature, the crude oil viscosity was reduced by 48%. Following the test results shown above, additive has demonstrated its capability to lower the viscosity of EBOK-14 crude oil by 48%.

EBOK-44:

The viscosity measurements show that EBOK-44 has less viscous crude oil compared to EBOK-11 and EBOK-14.

At atmospheric temperature, the viscosity value of the crude oil without additive is 885mPas. At 3% additive addition, the crude oil viscosity reduced to 550 mPas, representing 38% reduction in viscosity.

At flowing temperature, the crude oil viscosity also reduced from 310 mPas (crude oil without additive) to 200 mPas (crude oil with 3% additive), thus indicating 36% reduction in viscosity.

In conclusion, the additive of the disclosure has the ability to reduce viscosity of crude oil in EBOK field and helps increase production.

Example 4

Gas-Emission Reduction Of Diesel Engines Supplied with a Crude Oil Containing an Additive of the Invention A diesel generator (250 KVA) was powered by supplying diesel and diesel containing an additive of the disclosure and the gas-emissions were measured for four samples of each fuel.

The additive of Example 1 is used, in accordance with a ratio additive/crude oil of 1/800 (v/v).

Gas-emissions in the flue gas were measured using methods of the US Environmental Protection Agency (USEPA) as indicated below, for the following gas:

sulphur dioxide ($SO_2$), method USEPA 6C:2015/SOP WL-IP-086, nitrogen oxids ($NO_x$), method USEPA 7E:2015/SOP WL-IP-086, nitrogen monoxide (NO), method USEPA 7E:2015/SOP WL-IP-086, nitrogen dioxide ($NO_2$), method USEPA 7E:2015/SOP WL-IP-086, and carbon monoxide (CO), method USEPA 10:2015/SOP WL-IP-046.

The measurements were done in the following conditions:

at a temperature of 27.6° C., a flue gas temperature of 377.4° C., % oxygen flue gas 16.88 and % carbon dioxide in flue gas 3.68, for the tests with diesel (without additive) and at a temperature of 28.2° C., a flue gas temperature of 408.44° C., % oxygen flue gas 10.86 and % carbon dioxide in flue gas 7.86, for the tests with diesel with additive.

The results are reported in table 4 below.

TABLE 4

| Emitted gas Trial | | $SO_2$ mg/$Nm^3$ | $NO_x$ mg/$Nm^3$ | NO mg/$Nm^3$ | $NO_2$ mg/$Nm^3$ | CO mg/$Nm^3$ |
|---|---|---|---|---|---|---|
| Diesel fuel | 1 | 236.0 | 433.2 | 426.0 | 6.2 | 456.0 |
| | 2 | 256.0 | 438.6 | 430.0 | 6.6 | 454.0 |
| | 3 | 258.0 | 446.0 | 438.0 | 6.7 | 460.0 |
| | 4 | 250.0 | 439.2 | 431.3 | 6.5 | 456.6 |
| Diesel fuel + additive | 5 | 48.2 | 126.1 | 122.6 | 1.8 | 176.9 |
| | 6 | 51.2 | 129.2 | 127.1 | 2.2 | 182.1 |
| | 7 | 56.2 | 136.1 | 132.6 | 2.3 | 178.2 |
| | 8 | 51.8 | 130.9 | 127.4 | 2.1 | 179.1 |

These results evidence the exceptional ability of an additive of the disclosure to reduce the gas emission of an engine powered with a fuel comprising an additive of the disclosure.

The invention claimed is:

1. An additive for petroleum products comprising a mixture of alkylesters of fatty acids having respectively saturated C12 chains, saturated C14 chains, saturated C16 chains, saturated C6-10 chains, monounsaturated C18 chains, saturated C18 chains, di-unsaturated C18 chains and saturated C20 chains, wherein the fatty acids have the following composition:

at least 56% of saturated C12 chains,
at least 23% of saturated C14 chains,
at most 8% of saturated C16 chains,
at most 5% of saturated C6-10 chains,
at most 5% of monounsaturated C18 chains,
at most 2% of saturated C18 chains,
at most 0.8% of di-unsaturated C18 chains, and
at most 0.2% of saturated C20 chains,
the percentages being expressed in number of moles per total number of moles of alkylesters.

2. An additive for petroleum products comprising a mixture of alkylesters of fatty acids, said mixture comprising:
50-70 weight % of a mixture as defined in claim 1, and
30-50 weight % of a mixture of alkylesters of fatty acids having respectively monounsaturated C18 chains, di-unsaturated C18 chains, saturated C6-18 chains and saturated C20 chains, wherein the fatty acids have the following composition:
at least 74% of monounsaturated C18 chains,
at most 13% of di-unsaturated C18 chains,
at most 13% of saturated C6-18 chains,
at most 1% of saturated C20 chains,
the percentages being expressed in number of moles per total number of moles of alkylesters.

3. The additive of claim 2, wherein the fatty acids have the following composition:
35.60-42.15% of monounsaturated C18 chains,
27.60-31.40% of saturated C12 chains,
10.50-13.70% of saturated C14 chains,
5.80-7.30% of diunsaturated C18 chains,
3.50-5.15% of saturated C16 chains,
2.70-4.50% of saturated C6-C10 chains,
0.70-1.25% of saturated C18 chains, and
0.50-1.15% of saturated C20 chains.

4. The additive of claim 2, wherein the fatty acids have the following composition:
36.30-42.50% of saturated C12 chains,
20.60-27.30% of monounsaturated C18 chains,
14.60-17.30% of saturated C14 chains,
5.30-6.40% of saturated C16 chains,
3.80-4.75% of diunsaturated C18 chains,
2.50-3.70% of saturated C6-C10 chains,
1.05-1.80% of saturated C18 chains, and
0.50-1.15% of saturated C20 chains.

5. The additive of claim 1, wherein the unsaturations of the mono- and diunsaturated chains are cis.

6. The additive of claim 2, wherein the unsaturations of the mono- and diunsaturated chains are cis.

7. The additive of claim 1, wherein said fatty acid alkylesters are provided by at least one oil selected from palm kernel oil, palm oil and candlenut oil.

8. The additive of claim 2, wherein said fatty acid alkylesters are provided by at least one oil selected from palm kernel oil, palm oil and candlenut oil.

9. A method for treating contaminated soils, said method comprising contacting the contaminating soils with a mixture of alkylesters of fatty acids having respectively saturated C12 chains, saturated C14 chains, saturated C16 chains, saturated C6-10 chains, monounsaturated C18 chains, saturated C18 chains, di-unsaturated C18 chains, and saturated C20 chains, wherein the fatty acids have the following composition:
at least 56% of saturated C12 chains,
at least 23% of saturated C14 chains,
at most 8% of saturated C16 chains,
at most 5% of saturated C6-10 chains,
at most 5% of monounsaturated C18 chains,
at most 2% of saturated C18 chains,
at most 0.8% of di-unsaturated C18 chains, and
at most 0.2% of saturated C20 chains,
the percentages being expressed in number of moles per total number of moles of alkylesters.

10. An additive for fuel comprising a mixture of alkylesters of fatty acids having respectively saturated C12 chains, saturated C14 chains, saturated C16 chains, saturated C6-10 chains, monounsaturated C18 chains, saturated C18 chains, di-unsaturated C18 chains, and saturated C20 chains, wherein the fatty acids have the following composition:
at least 56% of saturated C12 chains,
at least 23% of saturated C14 chains,
at most 8% of saturated C16 chains,
at most 5% of saturated C6-10 chains,
at most 5% of monounsaturated C18 chains,
at most 2% of saturated C18 chains,
at most 0.8% of di-unsaturated C18 chains, and
at most 0.2% of saturated C20 chains,
the percentages being expressed in number of moles per total number of moles of alkylesters,
for decreasing combustion-engine exhaust gas,
said mixture being in a proportion ranging from 0.5-5% (w/w) with regard to said fuel.

11. The additive for petroleum products according to claim 1, being a viscosity additive effective in the absence of any other viscosity agent, in a proportion ranging from 0.5-5% (w/w) with regard to said petroleum product.

12. The additive for petroleum products according to claim 1, being a lubricating additive effective in the absence of any other lubricating agent, in a proportion ranging from 0.5-5% (w/w) with regard to said petroleum product.

* * * * *